June 16, 1925.

N. H. KNOWLTON

ASSEMBLING MACHINE

Filed Feb. 7, 1918

June 16, 1925.
N. H. KNOWLTON
ASSEMBLING MACHINE
Filed Feb. 7, 1918
1,541,823
7 Sheets-Sheet 4
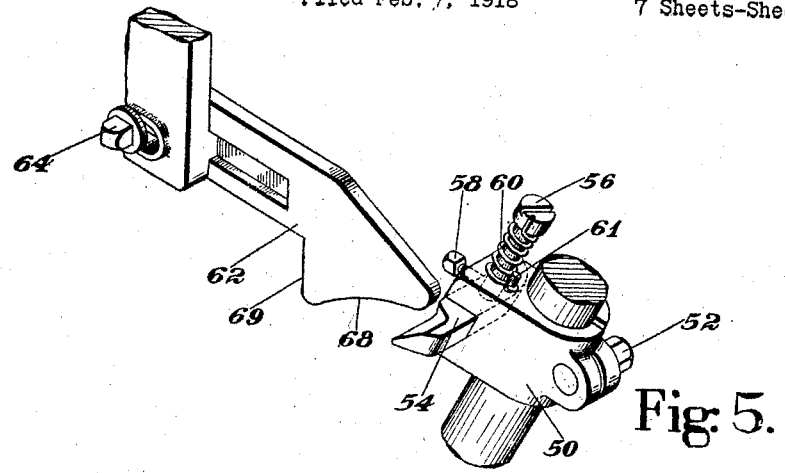
Fig. 5.
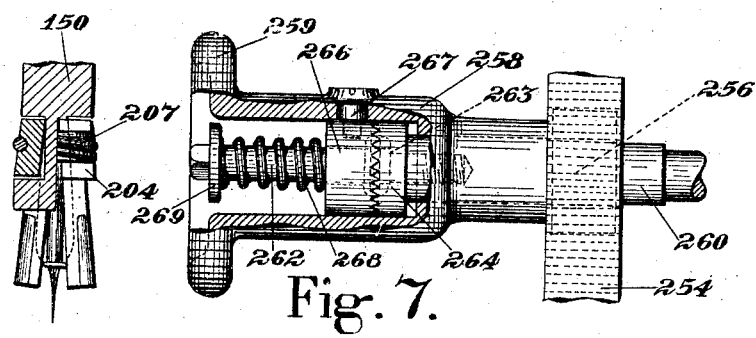
Fig. 6. Fig. 7.
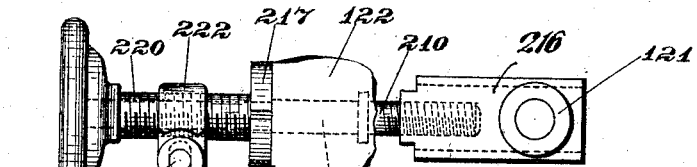
Fig. 8.
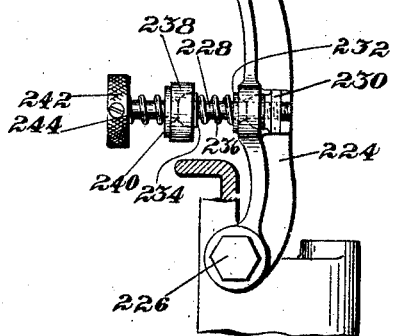
INVENTOR.
Norwood H. Knowlton
By his Attorney,
Nelson M. Howard

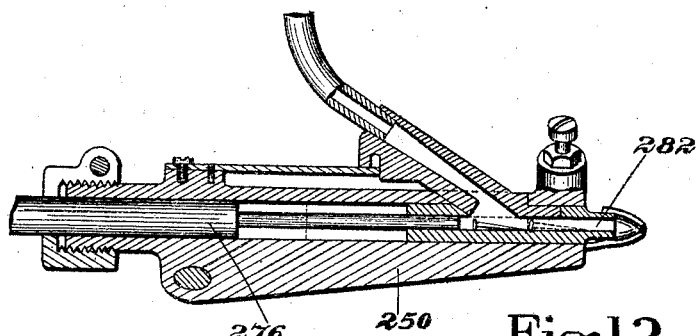
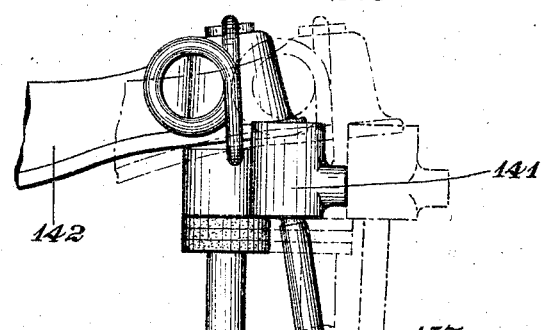
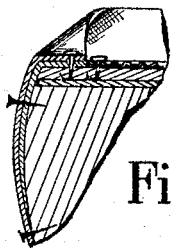
Fig.14.
Fig.13.
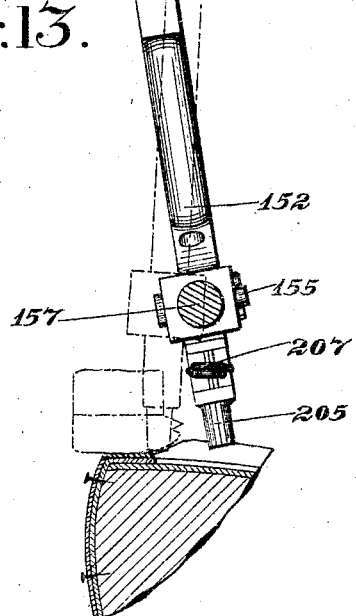
Fig.15.

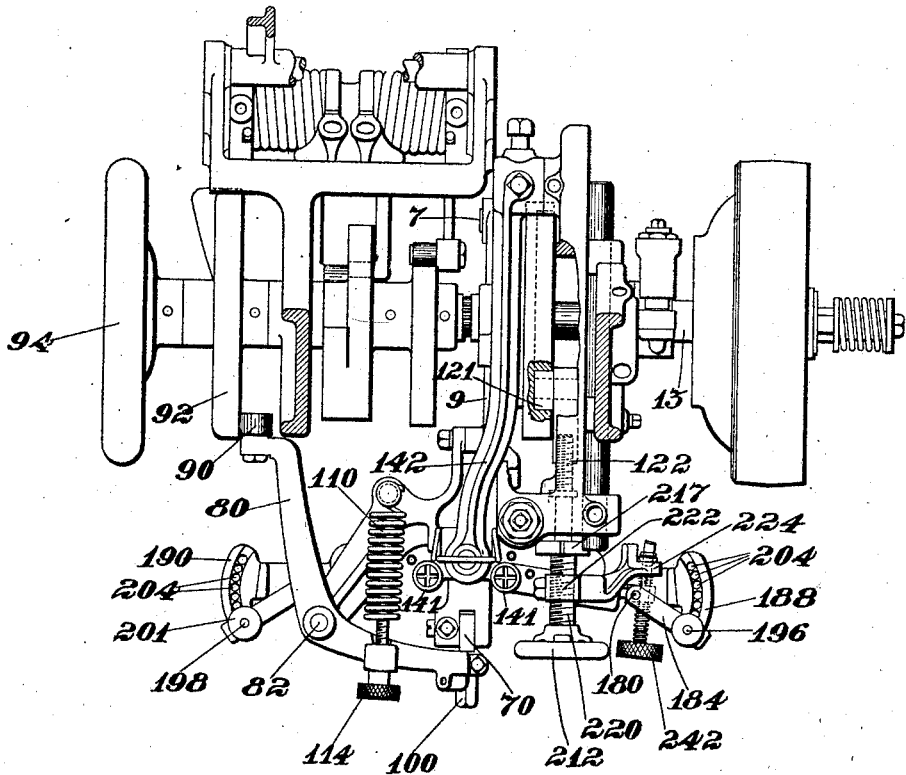

Patented June 16, 1925.

1,541,823

UNITED STATES PATENT OFFICE.

NORWOOD H. KNOWLTON, OF ROCKPORT, MASSACHUSETTS, ASSIGNOR TO UNITED SHOE MACHINERY CORPORATION, OF PATERSON, NEW JERSEY, A CORPORATION OF NEW JERSEY.

ASSEMBLING MACHINE.

Application filed February 7, 1918. Serial No. 215,774.

*To all whom it may concern:*

Be it known that I, NORWOOD H. KNOWLTON, a citizen of the United States, residing at Rockport, in the county of Essex and State of Massachusetts, have invented certain Improvements in Assembling Machines, of which the following description, in connection with the accompanying drawings, is a specification, like reference characters on the drawings indicating like parts in the several figures.

This invention relates to machines for assembling parts of boots and shoes upon their lasts preparatory to the pulling-over and lasting operations. For the purpose of illustration, an embodiment of the invention is herein shown as applied to a machine of the type described in United States Letters Patent No. 1,356,510, granted October 26, 1920, on application of Hannah Ashton, executrix of the will of Orrell Ashton, and in Letters Patent of the United States No. 1,443,288, granted January 23, 1923, upon application of William C. Stewart, to which reference may be had for explanation of parts of the machine not herein fully described. It is to be understood, however, that the invention is not restricted to embodiment in a machine of the particular type disclosed in said patents.

In the earlier machine above referred to, mechanism is provided for inserting tacks through the flange of the counter or heel stiffener and the heel seat portion of the sole by tackers which are advanced with the wiper from a position rearward of the shoe to a position over the counter flange. In the machine of the above mentioned Stewart patent, the tackers are positioned near each other initially and as they advance are separated in accordance with the width of the sole.

An object of this invention is to provide a machine in which the tackers which drive these counter flange tacks are so located and moved relatively to the upper and shoe bottom that all danger of their catching the upper and tacking that to the heel seat with the flange of the counter is avoided.

An important feature of the invention consists in an organization including a wiper and counter flange tackers which are moved in opposite directions, the wiper being moved over the shoe bottom and the tackers being moved into position over the counter flange. Preferably the counter tackers are initially positioned relatively to the shoe bottom at a point well forward or toward the toe of the shoe so that the rear portion of the upper when the shoe is presented beneath them will pass entirely beyond them, and means is provided for moving the tackers rearwardly over the shoe bottom until they are located over the flange of the counter at the proper distance from the rear end of the shoe.

Another feature of the invention consists in counter tackers which are initially positioned forwardly of the heel seat, with means for moving the tackers laterally of the shoe bottom in conjunction with their rearward movement. As herein shown, means is provided for varying independently the path which each counter tacker traverses during its rearward movement, including variation of the initial and final position of the tackers to adapt the machine for operation upon different classes of work and upon shoes of different sizes and widths.

Another feature of the invention consists in an organization by which the counter tackers are initially raised from the shoe bottom and are caused to move toward the shoe bottom in conjunction with their movement into tack driving position.

In the machine of the patents above referred to, two tacks are driven in the rear end of the shoe in rapid succession, the lower tack being driven first. When the lower tack is driven, the concussion of the driver blow causes the upper tack, then ready to be driven, to be disturbed in its chamber and sometimes to be caught in the air by the upper tack driver and broken or damaged so that it fails to be driven or is driven improperly.

A further feature of the invention consists in means for preventing disturbance of one tack by the concussion due to the earlier driving of another tack. As herein shown, the driver of the upper tack is advanced during the action of the driver for the lower tack and holds the uppr tack in a restricted part of the tack passage. The driver of the upper tack is then operated to drive the upper tack.

Another object of the invention is to provide a machine for assembling shoes which will positively grip the upper at the rear of the shoe and will exert an upward pull on the gripped portion, preferably of predetermined amount.

A further feature of the invention consists in improved gripper mechanism for seizing the upstanding margin of the upper at the rear of the shoe and pulling it without slippage so that uniform results are obtained.

Another feature of the invention consists in an organization including a wiper and a co-operating gripper, of means for uplifting the gripper and the wiper prior to the forward movement of the gripper for the purpose of giving an upward pull to the upper before the movement of the wiper and gripper over the last bottom, the wiper being then caused to lay the upper against the last bottom under tension in position to be secured. Preferably the uplift of the gripper is of predetermined amount and the gripper is preferably released only after the upper has passed completely under control of the wiper.

Another feature of the invention consists in means for automatically causing relative movement between the work support and the gripper as the support is moved toward the machine to facilitate positioning the margin of the upper between the wiper and the gripper. The construction is also such as to provide for return of the shoe support to position for removal of the work without the said relative movement. Preferably the relative movement referred to consists in a depression of the work support accompanying its movement toward the machine.

These and other features of the invention will appear more fully from the following detailed description when read in connection with the accompanying drawings and will be pointed out in the appended claims.

In the drawings,—

Fig. 5 is a detail in perspective of the jack depressing mechanism;

Fig. 6 is a sectional detail of one of the tack holders;

Fig. 7 is a view, partly in section, of the mechanism for adjusting the lower rear tacking mechanism;

Fig. 8 is a detail of the operating connections between the wiper slide and the counter tackers;

Fig. 12 is a sectional detail of the mechanism for driving the upper rear tack;

Fig. 13 is a view illustrating the initial inclined position of one of the flange tackers;

Fig. 14 is a sectional view of the rear portion of a shoe after treatment by the machine;

Fig. 15 is a view of a shoe bottom after treatment by the machine and shows in dotted lines the initial position of the flange tackers; and Fig. 16 is a plan view, partly in section, of parts shown in Fig. 2.

Figure 1:
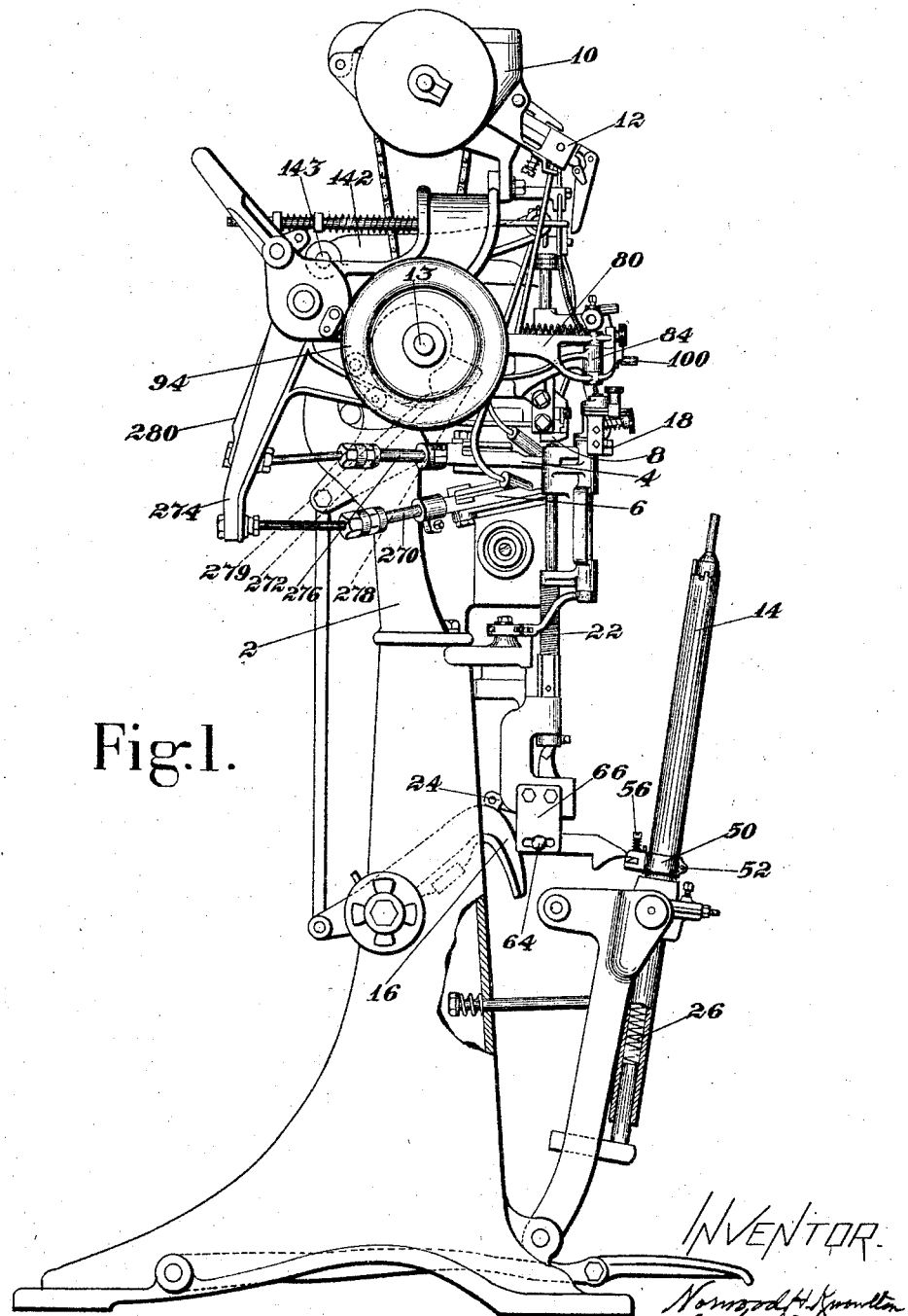
Fig. 1 is a side elevation of a machine embodying this invention.

The drawings represent a machine embodying the present invention which, except as to various mechanisms fully described herein, is of the construction described and claimed in the patents to which reference has been made above.

The numeral 2 indicates the frame of the machine. The upper and lower end tacking mechanisms are indicated, respectively, by 4 and 6, and the reciprocating wiper by 8, the latter being mounted on a carrier 9. The tacks for the various tacking mechanisms, including the counter tackers, to be described, are supplied from the tack pot 10 by tack separators located at 12 through suitable tubes, as shown, the tack drivers being operated in the usual manner by cams on a shaft 13. The depressible jack post 14 is locked at times against outward movement and against depression by the action of a hook 16. Side pressers 18, 20, which are operated by springs 22, press against the sides of the rear portion of the shoe and are released by contact of the hook 16 with the arm 24 of the bell-crank lever, the other arm of which effects movement of the pressers away from the shoe and compression of the springs 22. All the above mechanism is more fully described in the above-mentioned patents.

The jack post 14 is yieldingly supported by a spring 26 and mechanism is provided for depressing the jack post as it is swung into the machine. Referring to Figs. 1 and 5, the post has a block 50 clamped to it by a tap bolt 52. In a slot in the rear part of the block is a latch 54 pivoted thereto by a screw 56 held in the latch by a set screw 58. The latch, therefore, may turn in a clockwise direction against a spring 60 secured at one end to the block by a pin 61 and at the other end to the screw 56. The latch 54 projects at one side of the block and has a bevel face to engage a face 68 on a cam arm 62 which is secured by a screw 64 to a block 66 bolted to the machine frame. By loosening the screw 64, the cam arm 62 may be adjusted longitudinally, the screw 64 being located in a slot in the block 66 and there being, as shown in Fig. 5, a rib and groove connection between the arm and block to prevent movement of the arm on the screw 64 as a pivot. When the jack is swung toward the machine, the bevel face of the latch 54 engages the inclined face 68 of the arm 62 and the post is depressed until the latch reaches a vertical face 69 of the cam arm whereupon the post is raised by the spring 26. This construction insures that the jack, as it is swung toward the machine with a shoe upon it, will be depressed and then allowed to rise. The cam arm 62 is so adjusted longitudinally by loosening the screw 64 that the upstanding margin of the upper at the rear end of the shoe is lowered while passing a gripper member 70 and is allowed to rise when positioned vertically between the wiper 8 and the gripper 70. When the post 14 and shoe are swung outwardly, the latch 54 swings on its pivot 56 until the post has moved outwardly a sufficient distance to allow it to be returned to initial position by the spring 60.

Figure 2:
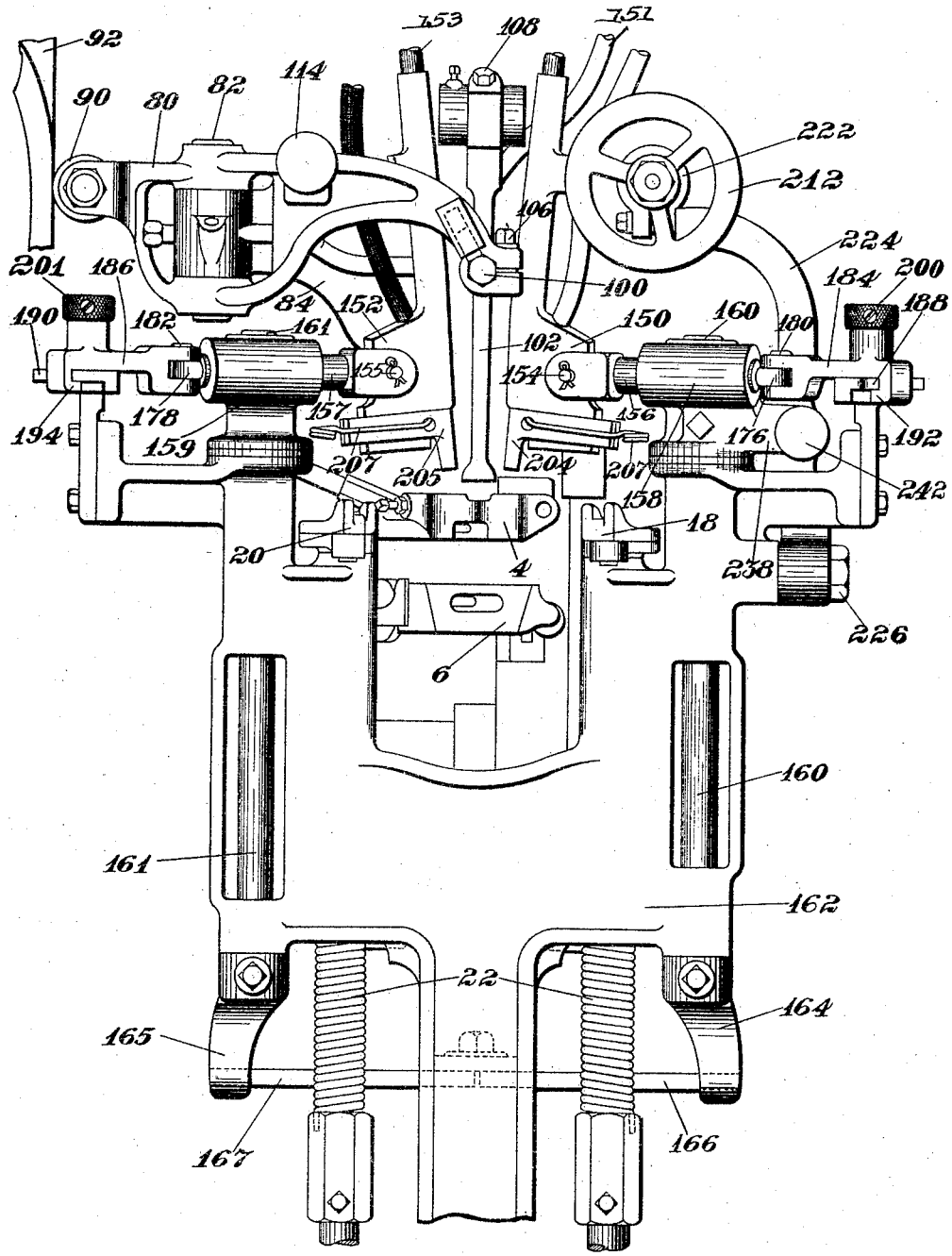
Fig. 2 is a front view of the machine omitting the top and bottom portions.
Figure 3:
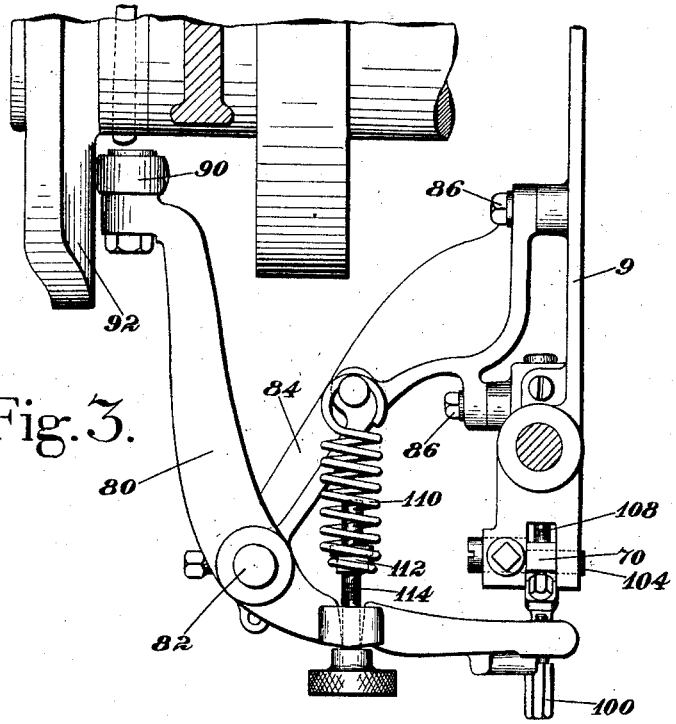
Fig. 3 is a plan view of the gripper operating mechanism of the machine.
Figure 9:
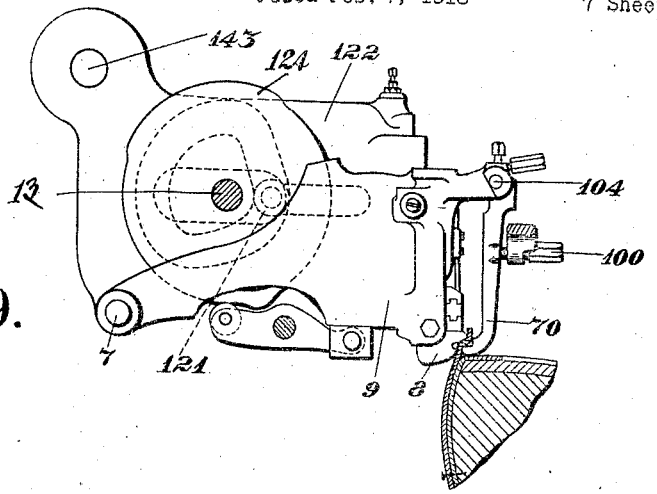
Figs. 9, 10 and 11 are views illustrating, respectively, the operation of the gripper and wiper in seizing, updrawing and overlaying the upper.
Figure 10:
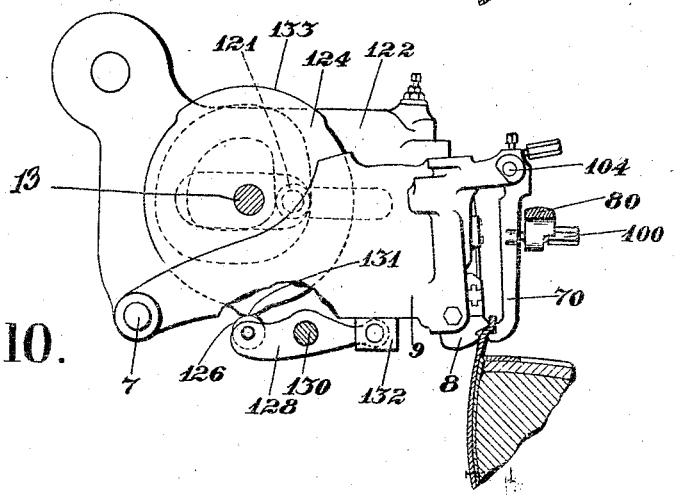
Figure 11:
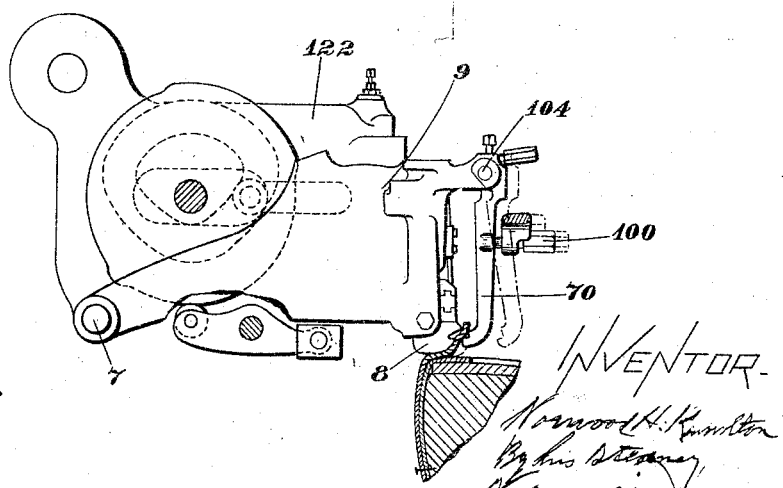

The gripper member 70 is operated by mechanism shown in Figs. 1, 2 and 3. An angle lever 80 is pivoted at 82 to a bracket 84 secured to the wiper carrier 9 at 86. The rear arm of the lever 80 carries a roll 90 which rests against a face cam 92 formed on the inner side of the hand wheel 94 of the machine and having a face sufficiently wide to allow the roll 90 to be moved radially of the cam by the forward movement of the carrier 9 without its relation to the cam being disturbed. The forward arm of the lever 80 extends transversely of the machine and has threaded through it a screw 100 which engages the gripper member 70 pivoted at 104 to the wiper carrier 9. The screw 100 has a long hexagonal head engaged by a spring plunger 106, Fig. 2, to prevent accidental turning of the screw which affords adjustment between the gripper member 70 and its actuating mechanism. Above the pivot 104 of the gripper 70 is a screw 108 arranged to engage the wiper carrier 9, Fig. 3, and limit outward swinging movement of the gripper jaw. The lever 80 is actuated by a spring 110 when permitted to do so by the cam 92. The spring 110 is connected to the bracket 84 at one end and at the other end is reduced in diameter to hold a nut 112. A thumb screw 114 passes through a bell-shaped opening in the lever 80 and engages the nut 112. By turning the thumb screw the tension of the spring 110 may be varied and hence the force with which the upper is gripped may be adjusted. When the cam 92 releases its inward pressure on the rear arm of the lever 80, the spring 110 will cause the screw 100 to press inwardly upon the member 70 and cause its lower end to force the upper against the co-operating face on the wiper 8 and firmly hold the upper. The co-operating faces of the wiper and gripper are preferably formed with interengaging angular formations which bend the gripped portion of the upper into a sharp angle or angles so that the grip of these members is substantially positive. At the time when the gripper operates, the upper has already been secured to the rear end face of the last by one tack driven adjacent to the cone of the last, as explained in the patent second above referred to, and is also held clamped against the lower V-block 6 by the action of the hook 16. The wiper carrier 9 is pivoted at 7 to a wiper slide 122 which is reciprocated by a cam roll 121 engaging a cam path in a cam block 124, Figs. 9, 10 and 11. The cam block 124 has also a cam on its periphery co-operating with a roll 126 on a lever 128 pivoted at 130 to the frame and having on the end opposite the roll 126 a block 132 adapted to engage the lower face of the wiper carrier 9 and to lift it when the roll 126 is engaged by a peripheral projection on the cam 124. The cam 124 has two such projections 131, 133. Referring to Figs. 10 and 11, it will be seen that after the gripper has closed and before the wiper begins the advance, the projection 131 acts upon the lever 128, causing the block 132 to lift the wiper carrier and, of course, the gripper, Fig. 10, thus effecting an upward pull of the upper stock from the point held by the lower rear end tack already driven. After the upward pull, the projection 131 rides off the roll 126, allowing the wiper to descend and lay the tensioned upper upon the heel seat, the wiper meantime being advanced by its cam to maintain tension on the upper. As soon as the wiper assumes control of the upper, the gripper is released and after the full wiping movement of the wiper has been effected, a tack is driven through the wiper in the usual manner by a driver bar 140 operated by a driver arm 142 pivoted at 143 to the wiper slide 122 and operated by a cam on the cam shaft 13 of the machine. The projection 133 acts to raise the wiper and hold it out of contact with the shoe during the return movement of the wiper.

Figure 4:
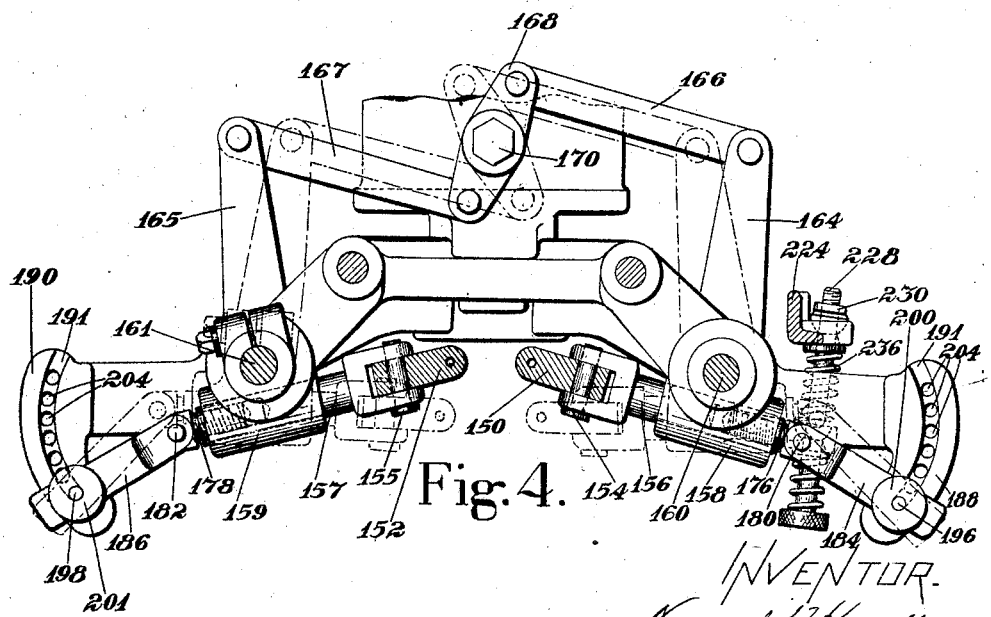
Fig. 4 is a plan view, partly in section, of the mechanism for operating the counter tackers.

Coincidentally with the driving of the heel seat tack, the counter tacks are driven by mechanism which will now be described. Referring to Figs. 2 and 4, casings 150, 152 for the counter flange tack drivers are pivoted by pins 154, 155 to the bifurcated ends of stems 156, 157 which are rotatably mounted in blocks 158, 159. These blocks are mounted to turn about vertical axis formed by rock shafts 160, 161 mounted in a stationary frame 162 attached to the frame of the machine. The shafts 160, 161 have at their lower ends rearwardly extending arms 164, 165 which are connected by links 166, 167 to opposite ends of an equalizing lever 168 having a stationary pivot 170 on the frame 162. By this mechanism, rotation of the shaft 160 will effect an equal and opposite rotation of the shaft 161, and the blocks 158, 159 will be moved to carry the casings 150, 152 longitudinally of the shoe as indicated by full and dotted lines in Fig. 4. In the casings 150, 152 are counter tack driver bars 151, 153 which have universal joint connections with a head 141 which carries the driver bar 140 of the wiper and is operated by the driver arm 142 as described.

In conjunction with their movement longitudinally of the shoe, the tacker casings 150, 152 are moved laterally amounts which may be adjustably varied by mechanism which will now be described. The stems 156, 157 are slidably longitudinally through the blocks 158, 159 and have their outer ends bored and threaded to receive screws 176, 178, the heads of which are pivoted at 180, 182 to the bifurcated ends of adjusting links 184, 186. The other ends of the links are arranged to slide on segmental plates 188, 190 which are secured to the frame 162. The links 184, 186 have guiding flanges 192, 194 extending under plates 188, 190 which have grooves 191 on their upper faces to receive spring studs 196, 198 mounted in the links 184, 186, respectively, and arranged to be raised by lifting nurled heads 200, 201. In the bottom of the grooves 191 are holes 204 into which the studs 196, 198 may enter to fix the ends of the links 184, 186 in adjusted position. When the spring studs 196, 198 are partially raised, the studs remain in the grooves 191 and guide the links for adjustment, and when the studs are fully raised the ends of the links may be entirely removed from the plates 188, 190 and rotated to turn the screws 176, 178 in and out of the stems 156, 157 to effect further adjustments of the flange tackers for different classes of work. The tacker casings 150, 152 are provided with tack holders 204, 205, each made in two parts and held together by a spring 207 to permit separation of the parts for the passage of the tack and driver, as shown in detail in Fig. 6.

The tackers are moved from the dotted line position of Fig. 4 to the full line position in that figure by means receiving motion from the wiper slide 122. Movement of the slide 122 to carry the wiper 8 over the shoe bottom is varied as usual by a screw 210, Fig. 8, having a hand wheel 212, the screw being rotatably mounted at 214 in the slide and threaded into a block 216 which carries the cam roll 121. Fixed on the screw 210 is a flange 217 provided with notches to be engaged by a spring plunger 218 to prevent unintentional turning of the screw. The outer portion 220 of the screw is threaded to receive a collar 222 which is loosely connected at 223 to the upper end of a bent lever 224 fulcrumed at 226 to the frame 162 and having between its ends a hole to receive a rod 228. At the rear of the lever 224 is a nut 230 threaded on the rod 228 and having a hemispherical formation to fit a similarly shaped recess in the lever 224. On the rod 228 is a loose washer 232 resting against the front face of the lever 224 and between the washer 232 and a collar 234 fixed on the rod is a spring 236. The collar 234 has a hemispherical face fitting a similarly shaped recess in a projection 238 from the block 158. A washer 240 loose on the rod 228 rests against the front face of the projection 238 and between this washer and a nurled head 242 on the rod is a spring 244. This construction effects a yielding actuation of the block 158 from the lever 224 in both directions and allows universal movement between the rod and the lever 224 and the projection 238. It will now be apparent that when the slide 122 moves forward to carry the wiper 8 over the shoe bottom, the lever 224 will be actuated and will act through the spring 236 pressing on the projection 238 to rock the block 158 on its axis 160, and through the connections described, carry the tackers 150, 152 toward the rear of the shoe bottom. At the same time, the upper ends of the tack driver bars 151, 153 will be moved outwardly by the advance of the head 141, Fig. 13, causing the tacker casings 150, 152 to swing on the stems 156, 157 and the tack holders below the stems to move rearwardly in conjunction with the bodily movement of the stems 156, 157 due to the rocking of the blocks 158, 159 through the lever 224 as above described. Each of the tacker casings will thus be moved from the full line position, Fig. 13, where the tackers are inclined, the tack holders positioned forwardly of the heel seat and spaced therefrom, to the dotted line position in that figure where the tackers are substantially perpendicular to the heel seat, the tack holders meantime having been given a rearward movement and also a movement of approach to the shoe bottom. As the wiper advance continues, a straightening of the joint 180 between the stem 156 and the link 184 will occur, which, in the adjustment shown in Fig. 4, will cause the tacker to move toward the median line of the heel seat in conjunction with this movement toward the rear of the heel seat. If, however, the outer end of the link 184 is initially positioned on the plate 188 so that the joint 180 is straight, the swinging of the block 158 will cause the stem 156 to be retracted as the tacker moves toward the rear of the shoe bottom, and the tacker will then have a component of movement away from the median line of the heel seat. By adjusting the end of the link 184 still further toward the inner end of the plate 188, the initial position of the tacker may be varied while retaining the retractive effect of further bending of the joint. Of course, the rocking of the block 158 will effect, as described, through the mechanism including the equalizing lever 168, a similar rocking of the block 159 and the link 186 will act on the tacker 152, 205 in a manner similar to the action of the link 184 upon the tackers 150, 204. As a result, both tackers are initially positioned forwardly of the heel seat and inside the projecting margin of the upper, and in conjunction with the advance of the wiper 8 over the shoe bottom, are moved rearwardly to a position over the flange of the counter. This movement may be acompanied by separating movement or by a movement of approach as the particular work being treated may demand, and according to the adjustment of the outer ends of the links 184, 186. If desired, the links may be adjusted dissimilarly when the nature of the work renders such an adjustment advantageous. It is desirable that the lower tacker and abutment be conveniently adjustable vertically for different heights of lasts and to vary the position of the lower rear tack. This is accomplished by mechanism shown in Fig. 7. The lower abutment 6 and rear tacker are mounted on a slide 254 arranged for vertical movement and having rack teeth formed on its rear face. A pinion 256 fixed to a sleeve 258 having a hand wheel 259 engages the rack and is rotatably mounted on a fixed stud shaft 260. A screw 262 passes through a toothed member 264 and is threaded into the end of the shaft 260. The screw 262 has a shoulder 263 to engage the member 264 and rigidly clamp it against the shaft 260. A toothed sleeve 266 is located in the sleeve 258 and is secured thereto by a screw 267. The screw 262 passes freely through the toothed sleeve 266 and carries a spring 268 abutting against the sleeve 266 at one end and against a flange 269 on the screw at the other end. The effect of the spring is to hold the teeth on the sleeve 266 in engagement with the teeth on the member 264. By grasping the hand wheel 259 and pulling the sleeve 258 longitudinally of the shaft 260 against the spring 268, the teeth may be disengaged and the hand wheel and pinion 256 turned to adjust the slide 254 and hence the lower abutment 6 vertically at the rear end of the shoe.

When the lower rear end tack is driven, the upper rear end tack has been fed and lies in the tack driver passage ready to be driven a moment later, Fig. 12. The shock or concussion caused by driving the lower tack has been found sometimes to displace the upper end tack in its chamber and cause the driver of the upper tack to catch the tack in the air and to cut it in two or damage it so that it cannot subsequently be properly driven. In the machine of the present invention, the difficulty is overcome by mechanism shown in Figs. 1 and 12. The lower tack driver bar 270, Fig. 1, is operated by a cam 272 through a lever 274 and the upper tack driver bar 276 is operated by a cam 278 through a lever 280. The cams rotate in a clockwise direction and hence the drop of the cam 272 is in advance of the drop of the cam 278 to cause the lower tack to be driven first. In the cam 278 there is a depression 279 which is operative at the time the drop of the cam 272 occurs to allow the upper tack driver to advance toward the driving position, as shown in dotted lines in Fig. 12, so as to push the tack into a portion 282 of the tack passage where it is so confined that it cannot be displaced by concussion due to the driving of the lower tack. After the lower tack is driven, the upper tack driver is retracted by its cam 278 and released to drive the upper tack.

Having thus described my invention, what I claim as new and desire to secure by Letters Patent of the United States is:

1. In a machine of the class described, the combination of a wiper movable over a shoe bottom, a tacker movable in a direction opposite to that of the wiper, and means for moving the wiper and tacker to do their work.

2. In a machine of the class described, the combination of a wiper movable inwardly of a shoe bottom, a tacker movable rearwardly and outwardly of the shoe bottom, and means for so operating the wiper and tacker to do their work.

3. In a machine of the class described, the combination of a wiper movable toward the toe of a shoe, a tacker movable longitudinally of the shoe toward the heel end of the shoe, and means for moving the wiper and tacker to do their work.

4. In a machine of the class described, the combination of a wiper movable over a shoe bottom, a tacker movable in a direction opposite to that of the wiper, and means for moving the wiper and tacker simultaneously.

5. In a machine of the class described, the combination of a wiper movable forwardly over the shoe bottom, a tacker movable rearwardly and outwardly relatively to the shoe bottom, and means for operating the wiper and tacker to do their work.

6. In a machine for securing parts of boots and shoes in assembled relation upon a last preliminary to lasting, the combination of tackers positioned over the shoe bottom and arranged for movement toward the rear of the shoe, and means for effecting movement of the tackers rearwardly of the shoe to position the tackers over the flange of the counter of the shoe.

7. In a machine for securing parts of boots and shoes in assembled relation upon a last preliminary to lasting, the combination of tackers positioned over the shoe bottom and arranged for movement toward the rear of the shoe, and means for effecting movement of the tackers rearwardly of the shoe and toward the shoe bottom to position the tackers over the flange of the counter of the shoe.

8. In a machine for securing parts of boots and shoes in assembled relation upon a last preparatory to lasting, the combination of a wiper movable from the rear over the shoe bottom, tackers positioned over the bottom of the shoe, means for moving the tackers in a direction opposite to the movement of the wiper, and means for effecting movement of the tackers laterally of the shoe.

9. In a machine for securing parts of boots and shoes in assembled relation upon a last preparatory to lasting, the combination of a wiper movable from the rear over the shoe bottom, tackers positioned over the bottom of the shoe, means for moving the tackers in a direction opposite to the movement of the wiper, and means responsive to such movement of the tackers for effecting movement of the tackers laterally of the shoe.

10. In a machine for securing parts of boots and shoes in assembled relation upon a last preparatory to lasting, the combination of a wiper movable from the rear over the shoe bottom, tackers positioned over the shoe bottom and movable in a direction opposite to the movement of the wiper, and connections between the wiper and tackers to cause movement of the tackers toward the wiper to position the tackers over the flange of the counter.

11. In a machine for securing parts of boots and shoes in assembled relation upon a last preparatory to lasting, the combination of a wiper movable from the rear over the shoe bottom, tackers positioned over the shoe bottom and movable in a direction opposite to the movement of the wiper, and connections between the wiper and tackers to cause movement of the tackers toward the wiper and also laterally away from the wiper to effect the positioning of the tackers over the flange of the counter adjacent to the corners of the heel seat.

12. In a machine for securing parts of boots and shoes in assembled relation upon a last preliminary to lasting, the combination of tackers normally positioned over the bottom of a shoe, means for moving the tackers rearwardly over the shoe, and means for separating the tackers to position the tackers over the flange of the counter.

13. In a machine for securing parts of boots and shoes in assembled relation upon a last preparatory to lasting, the combination of a shoe support, a member arranged for reciprocation over the heel seat longitudinally of the shoe, tacking mechanisms operated by movement of said member in a direction of approach to said member, and means for operating the tacking mechanisms as they approach the member to cause the tacks to be driven through the counter flange adjacent to the edge of the last bottom.

14. In a machine for securing parts of boots and shoes in assembled relation upon a last preliminary to lasting, the combination of tackers normally positioned over the bottom of a shoe, means for moving the tackers rearwardly over the shoe, means for separating the tackers to position the tackers over the flange of the counter, and means for varying the amount of separation of the tackers.

15. In a machine for securing parts of boots and shoes in assembled relation upon a last preliminary to lasting, the combination of tackers normally positioned over the bottom of a shoe, means for relatively moving the tackers and shoe a predetermined distance to position the tackers longitudinally of the shoe, and means for simultaneously moving the tackers relatively to each other to position the tackers over the flange of the counter.

16. In a machine for securing parts of boots and shoes in assembled relation upon a last preliminary to lasting, the combination of tackers normally positioned over the bottom of a shoe, means for relatively moving the tackers and shoe a predetermined distance to position the tackers longitudinally of the shoe, means for simultaneously moving the tackers relatively to each other to position the tackers over the flange of the counter, and means adapted to be set manually to vary the relative movement of the tackers.

17. In a machine for securing parts of boots and shoes in assembled relation upon a last preliminary to lasting, the combination of tackers normally positioned over the shoe bottom, means for relatively moving the tackers and shoe to position the tackers over the rear end of the shoe, and means for adjusting the tackers laterally at predetermined distances from the median line of the rear portion of the sole irrespectively of the width of the shoe.

18. In a machine for securing parts of boots and shoes in assembled relation upon a last preliminary to lasting, the combination of tackers normally positioned over the shoe bottom, means for relatively moving the tackers and shoe to position the tackers over the rear end of the shoe and for separating the tackers to position them at the corners of the heel seat.

19. In a machine for securing parts of boots and shoes in assembled relation upon a last preparatory to lasting, the combination of means for holding an upper and last in assembled relation, tacking means initially positioned over the shoe bottom, means for moving the last and tacking means relatively to position the tacking means over the rear portion of the heel seat, and means acting in consequence of such relative movement to position the tacking means inside the upper and over the counter flange at the corners of the counter.

20. In a machine for securing parts of boots and shoes in assembled relation upon a last preparatory to lasting, the combination of means for holding an upper and last in assembled relation, tacking means initially positioned over the shoe bottom, means for moving the last and the tacking means relatively to position the tacking means over the rear portion of the heel seat, and means acting in consequence of such relative movement to lower the tacking means for tacking the counter flange to the heel seat.

21. In a machine for securing parts of boots and shoes in assembled relation upon a last preliminary to lasting, the combination of means for holding an upper and last in assembled relation, tackers located over the last bottom inwardly of the counter flange, and means for causing the tackers to assume positions over the flange of the counter prior to the tacking operation.

22. In a machine for securing parts of boots and shoes in assembled relation upon a last preliminary to lasting, the combination of means for holding an upper and last in assembled relation, tackers located over the last bottom and movable rearwardly thereof, and means for moving the tackers to position the tackers over the flange of the counter.

23. In a machine for securing parts of boots and shoes in assembled relation upon a last preliminary to lasting, the combination of means for holding an upper and last in assembled relation, tackers located over the last bottom and movable rearwardly thereof, means for moving the tackers, and means for separating the tackers in conjunction with their rearward movement to locate the tackers over the corners of the counter flange.

24. In a machine for securing parts of boots and shoes in assembled relation upon a last preliminary to lasting, the combination of means for holding an upper and last in assembled relation, tackers located over the last bottom and movable laterally and rearwardly thereof, and means for moving the tackers to locate the tackers over the corners of the counter flange.

25. In a machine for securing parts of boots and shoes in assembled relation upon a last preparatory to lasting, the combination of means for holding an upper and last in assembled relation, means for securing the upper to the last, means for securing the flange of the counter to the heel seat by fastenings which fastenings do not hold the outer thickness of the upper, said means being positioned initially over the shoe bottom forwardly of the heel seat, and means for moving the last mentioned securing means rearwardly to a position over the flange of the counter prior to each securing operation.

26. In a machine for securing parts of boots and shoes in assembled relation upon a last preparatory to lasting, the combination of means for holding an upper and last in assembled relation; means for securing the flange of the counter and upper to the heel seat and other securing means for securing the flange of the counter by fastenings, which fastenings do not hold the outer thickness of the upper, said flange securing means being positioned initially over the shoe bottom forwardly of the heel seat; and means for moving the flange securing means rearwardly to a position over the flange of the counter prior to each securing operation.

27. In a machine for securing parts of boots and shoes in assembled relation upon a last preliminary to lasting, the combination of means for holding an upper and last in assembled relation upon the last; means for securing the flange of the counter to the heel seat, said means having an initial position forwardly of the heel seat; means for moving said securing means rearwardly to position it midway of the counter flange; and means for varying the securing position of said securing means to accommodate variations in the width of the heel seat.

28. In a machine for securing parts of boots and shoes in assembled relation upon a last preliminary to lasting, the combination of means for holding an upper and last in assembled relation upon the last; means for securing the flange of the counter to the heel seat, said means having an initial position forwardly of the heel seat; means for moving said securing means rearwardly to position it midway of the counter flange; and means for varying the initial and the securing positions of said securing means to accommodate variations in the width of the heel seat.

29. In a machine for securing parts of boots and shoes in assembled relation upon a last preparatory to lasting, the combination of shoe supporting means, a wiper movable over the rear portion of the heel seat, tacking means operating through the wiper to secure the upper to the heel seat, tacking mechanisms initially positioned forwardly of the heel seat, and means operated by the wiper as it advances to move said mechanisms toward the wiper to locate them over the counter flange of the heel seat.

30. In a machine for securing parts of boots and shoes in assembled relation upon a last preparatory to lasting, the combination of shoe supporting means, a wiper movable over the rear portion of the heel seat, tacking means operating through the wiper to secure the upper to the heel seat, tacking mechanisms normally positioned forwardly of the heel seat, and means operated by the wiper as it advances to move said mechanisms toward the wiper and to separate the mechanisms to locate them over the counter flange at the corners of the heel seat.

31. In a machine for securing parts of boots and shoes in assembled relation upon a last preparatory to lasting, the combination of a shoe support, a member arranged for reciprocation over the heel seat longitudinally of the shoe, tacking mechanisms operated by movement of said member in a direction of approach to said member, and means for relatively separating the tacking mechanisms as they approach the member to cause the tacks to be driven through the counter flange at each side of said member.

32. In a machine for securing parts of boots and shoes in assembled relation upon a last preparatory to lasting, the combination of tackers positioned forwardly of the heel seat of the shoe and spaced above the shoe bottom, means for moving the tackers and the shoe relatively to position the tackers over the counter flange, and means for causing the tackers to approach the shoe during their positioning movement.

33. In a machine for securing parts of boots and shoes in assembled relation upon a last preparatory to lasting, the combination of tackers positioned forwardly of the heel seat and the shoe and spaced above the shoe bottom, means for moving the tackers and the shoe relatively to position the tackers over the counter flange, and means responsive to such movement for causing the tackers to approach the shoe during their positioning movement.

34. In a machine for securing parts of boots and shoes in assembled relation upon a last preparatory to lasting, the combination of a wiper, tackers positioned forwardly of the heel seat, means for moving the tackers to position the tackers over the counter flange, and means operated by the wiper for moving the tackers toward the work as they approach tacking position.

35. In a machine for securing parts of boots and shoes in assembled relation upon a last preparatory to lasting, the combination of a wiper, tackers positioned forwardly of the heel seat comprising tack holding means, means for moving the tackers to position the tackers over the counter flange, and means operated by the wiper for moving the tack holding means toward the work as they approach tacking position.

36. In a machine of the class described, the combination of a reciprocating wiper, a gripper adapted to co-operate with the wiper positively to seize and hold against slippage the upstanding margin of the upper of a shoe, means for relatively operating the gripper and wiper to cause the upper to be seized between them, and means for causing the gripper and wiper to lay the upper upon the shoe bottom before it is released.

37. In a machine of the class described, the combination of a reciprocating wiper, a gripper adapted to co-operate with the wiper positively to seize the upstanding margin of the upper of a shoe, means for operating the gripper to seize the upper, means for uplifting the wiper and the gripper to updraw the upper, and means for causing the griper and wiper to lay the upper upon the shoe bottom before it is released.

38. In a machine of the class described, the combination of a reciprocating wiper, a gripper adapted to co-operate with the wiper positively to seize the upstanding margin of the upper of a shoe, means for operating the gripper to seize the upper, means for positively uplifting the wiper and the gripper to updraw the upper a predetermined amount, and means for causing the gripper and wiper to lay the upper upon the shoe bottom before it is released.

39. In a machine of the class described, the combination of a reciprocating wiper, a gripper adapted to co-operate with the wiper in seizing the upstanding margin of the upper of a shoe, a shoe support movable toward the machine, and means for moving relatively the gripper and shoe support to cause the upper margin to pass beneath the gripper when the support is moved toward the machine and then to cause positioning of the upper behind the gripper.

40. In a machine of the class described, the combination of a reciprocating wiper, a gripper adapted to co-operate with the wiper in seizing the upstanding margin of the upper of a shoe, a shoe support movable toward the machine and arranged for depression to enable the upper margin to be positioned behind the gripper, and means for depressing the support as it is moved toward the machine and releasing the support to allow the upper to rise behind the gripper.

41. In a machine of the class described, the combination of a reciprocating wiper, a gripper adapted to co-operate with the wiper in seizing the upstanding margin of the upper of a shoe, a shoe support movable toward the machine and arranged for depression to enable the upper margin to pass beneath the gripper, means for depressing the support as it is moved toward the machine and for releasing the support to allow the upper to rise behind the gripper, and means permitting reverse movement of the shoe support without depression.

42. In a machine of the class described, the combination of a wiper movable over the last bottom, tacking means for inserting tacks in the rear end of the shoe at different distances from the plane of movement of the wiper, adjusting means for said tacking mechanism comprising a rack on the tacking mechanism, a longitudinally movable sleeve rotatably mounted on a fixed axis, a pinion therein engaging the rack, a stationary locking member inside the sleeve, a second locking member secured to the sleeve internally thereof and adapted to engage the first locking member, and yielding means for holding the locking members in engagement and permitting disengagement thereof for turning the sleeve by longitudinal movement of the sleeve.

43. In a machine for securing parts of boots and shoes in assembled relation upon a last preparatory to lasting, the combination of shoe supporting means, a wiper movable over the rear portion of the heel seat, tacking means to secure the overwiped upper to the heel seat, a plurality of tackers for inserting tacks in the rear end of the shoe in a substantially horizontal direction, means for feeding tacks to said tackers simultaneously, means for operating the tackers in succession, and means for preventing displacement of a tack in one tacker while the other tack is being driven.

44. In a machine for securing parts of boots and shoes in assembled relation upon a last preparatory to lasting, the combination of shoe supporting means, a wiper movable over the rear portion of the heel seat, tacking means to secure the wiped over upper to the heel seat, a plurality of tackers for inserting tacks in the rear end of the shoe in a substantially horizontal direction, means for feeding tacks to said tackers simultaneously, and means for advancing one tack driver while the other tack is being driven to prevent displacement of the first tack by the concussion caused by driving the second tack.

45. In a machine for securing parts of boots and shoes in assembled relation upon a last preparatory to lasting, the combination of shoe supporting means, a wiper movable over the rear portion of the heel seat, tacking means to secure the wiped over upper to the heel seat, a plurality of tackers arranged to drive tacks substantially horizontally in vertical spaced relation at the rear end of the shoe, means for feeding tacks to the tacker simultaneously, means for operating the tackers in succession, and means for advancing the driver of the upper tacker to prevent displacement of the fed tack during the driving of the lower tack.

46. In a machine of the class described, the combination of a plurality of tack drivers arranged substantially horizontal, means for feeding tacks thereto simultaneously, means for operating the tackers in succession, and means for preventing displacement of the tack in one tacker while the other tack is being driven.

47. In a machine of the class described, the combination of a plurality of tack drivers arranged substantially horizontal, means for feeding tacks thereto simultaneously, means for operating the tackers in succession, and means for advancing the one tack driver while the other tack is being driven to prevent displacement of the first tack by the concussion caused by driving the second tack.

48. In a machine of the class described, the combination of means for driving upper and lower tacks in the rear end of an inverted shoe, means for operating the lower tack driver in advance of the upper tack driver, means for advancing the upper tack driver while the lower tack is being driven to prevent displacement of the upper tack by the concussion caused by driving the lower tack, and means for thereafter operating the upper tack driver to drive the upper tack.

49. In a machine of the class described, the combination of a reciprocating wiper, a gripper arranged to co-operate with the wiper in seizing the upstanding margin of the upper of a shoe, a shoe support movable toward and from the machine, and means operated by movement of the support for effecting relative vertical movement between the support and the wiper and gripper to cause the upstanding margin of the upper to be positioned behind the gripper, said relative movement taking place near the end of the movement of the work support toward the machine.

50. In a machine of the class described, the combination of a reciprocating wiper, a gripper arranged to co-operate with the wiper in seizing the upstanding margin of the upper of a shoe, a depressible shoe support arranged for movement toward and from the machine, and means operated by inward movement of the shoe support to cause the work support to be depressed.

51. In a machine of the class described, the combination of means for operating upon a shoe upper, a shoe support movable toward and from the operating means, and means acting as an incident to movement of the shoe support for effecting relative movement between the support and the operating means first away from and then toward each other to bring the shoe upper into operative relation to the operating means.

52. A machine of the class described having, in combination, a wiper and a gripper between which the upstanding margin of a shoe upper is to be positioned, a shoe support movable toward and from the wiper and gripper, and means responsive to movement of the shoe support for causing the upper to be first lowered and then raised to position it between the gripper and the wiper.

53. In a machine for securing parts of boots and shoes in assembled relation upon a last preparatory to lasting, the combination of tackers spaced above the shoe bottom, means for moving the tackers and the shoe relatively to position the tackers over the counter flange, and means for causing the tackers to approach the shoe prior to their tack driving operation.

54. In a machine for securing parts of boots and shoes in assembled relation upon a last preparatory to lasting, the combination of a wiper, tackers including driver bars movable over the heel seat, means for moving the tackers to position them over the counter flange, and means operated prior to the tack driver bars for moving the tackers toward the work as they approach tacking position.

55. In a machine of the class described, the combination of a plurality of drivers, means for feeding tacks to the drivers simultaneously, means for operating the drivers in succession, and means for preventing displacement of the later driven tack because of the concussion produced by driving of the earlier driven tack.

56. In a machine of the class described, the combination of a plurality of drivers, means for feeding tacks to the drivers, and driver operating means organized to advance one driver to hold a tack from displacement and simultaneously to drive another tack and then to operate the advanced driver to drive the tack held from displacement.

57. In a machine of the class described, organized to perform its cycle and stop; a plurality of tack drivers acting successively in the cycle, means for supplying tacks to the drivers, and means to advance one driver to prevent displacement of its tack during operation of the other driver and then acting to drive the tack held from displacement.

58. In a machine of the class described, the combination of a gripper for seizing an upper, a portion of said gripper being constructed and arranged to act as a wiper to lay the upper against the shoe bottom, and power operated means for imparting to the gripper positive updraw and overdraw movements and wiping movements.

59. In a machine of the class described, the combination of a pair of jaws relatively movable to seize an upper, said jaws being formed to secure a non-slipping grip upon the upper, a power shaft, and cam means on the shaft for imparting positive updraw and overdraw movements to the jaws while the upper is gripped.

In testimony whereof I have signed my name to this specification.

NORWOOD H. KNOWLTON.